(12) United States Patent
Takahashi (10) Patent No.: US 8,332,745 B2
(45) Date of Patent: Dec. 11, 2012

(54) ELECTRONIC FILING SYSTEM AND ELECTRONIC FILING METHOD

(75) Inventor: Takeshi Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1675 days.

(21) Appl. No.: 11/256,023

(22) Filed: Oct. 20, 2005

(65) Prior Publication Data

US 2006/0087668 A1   Apr. 27, 2006

(30) Foreign Application Priority Data

Oct. 21, 2004   (JP) .................................. 2004-307160

(51) Int. Cl.
*G06F 17/00*   (2006.01)

(52) U.S. Cl. ....................... 715/236; 715/277

(58) Field of Classification Search .......... 715/234–236, 715/200, 254, 277, 838, 243, 252
See application file for complete search history.

(56) References Cited

U.S. PATENT DOCUMENTS

| | | | |
|---|---|---|---|
| 5,717,940 A | 2/1998 | Peairs et al. | |
| 6,356,908 B1 * | 3/2002 | Brown et al. ........................ | 1/1 |
| 6,964,025 B2 * | 11/2005 | Angiulo et al. ............... | 715/838 |
| 6,996,781 B1 * | 2/2006 | Myers et al. .................. | 715/763 |
| 7,100,106 B1 * | 8/2006 | Ramaley et al. .............. | 715/234 |
| 2002/0007367 A1 | 1/2002 | Narahara | |
| 2002/0035579 A1 * | 3/2002 | Wang et al. ................... | 707/513 |
| 2002/0147847 A1 * | 10/2002 | Brewster et al. .............. | 709/246 |
| 2003/0061229 A1 | 3/2003 | Lusen | |
| 2003/0084405 A1 | 5/2003 | Ito | |
| 2004/0010754 A1 * | 1/2004 | Jones ............................ | 715/513 |
| 2004/0088281 A1 | 5/2004 | Matsuishi | |
| 2004/0205629 A1 | 10/2004 | Rosenholtz | |
| 2010/0195131 A1 * | 8/2010 | Nakata ......................... | 358/1.13 |

FOREIGN PATENT DOCUMENTS

| | | |
|---|---|---|
| EP | 1306777 A | 5/2003 |
| EP | 1437885 A1 | 7/2004 |
| JP | 10-240724 A | 9/1998 |

(Continued)

OTHER PUBLICATIONS

Ishitani Y: "Document transformation system from papers to XML data based on pivot XML document method," Document Analysis and Recognition , (ICDAR 2003). Proceedings. Seventh International Conference on Aug. 3-6, 2003. Piscataway, NJ, USA, IEEE, Aug. 3, 2003. pp. 250-255.

Bornstein N:"NET and XML" , Nov. 2003, Oreilly , Chapter 7, URL:http:// www.oreilly.de/catalog/netxml/chapter/.

*Primary Examiner* — Manglesh M Patel (74) *Attorney, Agent, or Firm* — Canon USA, Inc., I.P. Division (57) ABSTRACT

An electronic filing system registers and manages a document. For this purpose, the electronic filing system includes a style-sheet setting unit configured to set style sheet data in a storage unit, an input unit configured to input a document to be registered, a style-sheet acquisition unit configured to acquire style sheet data from the style sheet data set in the storage unit in which the input document is registered, and a conversion unit configured to convert the input document using the style sheet data acquired by the style-sheet acquisition unit. The electronic filing system further includes a reduced-image generation unit configured to generate a reduced image from the document converted by the conversion unit, and a registration unit configured to link the reduced image generated by the reduced-image generation unit to the input document.

6 Claims, 11 Drawing Sheets

FOREIGN PATENT DOCUMENTS

| | | |
|---|---|---|
| JP | 2000-259640 A | 9/2000 |
| JP | 2003-131930 A | 5/2003 |
| JP | 2003-162532 A | 6/2003 |
| WO | 00/56033 A1 | 9/2000 |

* cited by examiner

*DOCUMENT ENTITY DATA:
SOURCE DATA OR XML DATA GENERATED
FROM SOURCE DATA THROUGH XML CONVERSION

```
<?xml version="1.0"?>
<company="XXX Company" category="Stock" date="2003-12-28">
  <news>
        XXX Company have been grown in this terms again.
        Almost analyst evaluate it as AAA.
  </news>
</company>
```

1200

1201

ELECTRONIC FILING SYSTEM AND ELECTRONIC FILING METHOD

BACKGROUND OF THE INVENTION

1. Field of the Invention

The present invention relates to electronic filing systems for managing and storing electronic documents. And particularly to an apparatus, a method, and a program for generating a reduced image of an electronic document to be managed.

2. Description of the Related Art

There are known electronic filing apparatuses (document management apparatuses) that link document management information to document image data generated by reading a document with a scanner to store the linked document management information and document image data so that these stored document images can be searched based on the linked document management information, displayed, and printed. These electronic filing apparatuses link document management information (document names, numbers of pages, registration dates, keywords, etc.) to documents to register the linked document management information and the documents. For example, when a document list and a search result list are to be displayed, these items of document management information are displayed as information for identifying documents.

However, it is difficult for a user to identify the outline of a document by taking a first glance at such document management information only. To overcome this difficulty, an electronic filing apparatus for generating and registering reduced images (thumbnails) of electronic documents and displaying the reduced images in a document list and a search result list is also proposed (see, for example, Japanese Patent Laid-Open No. 10-240724).

Figure 10:
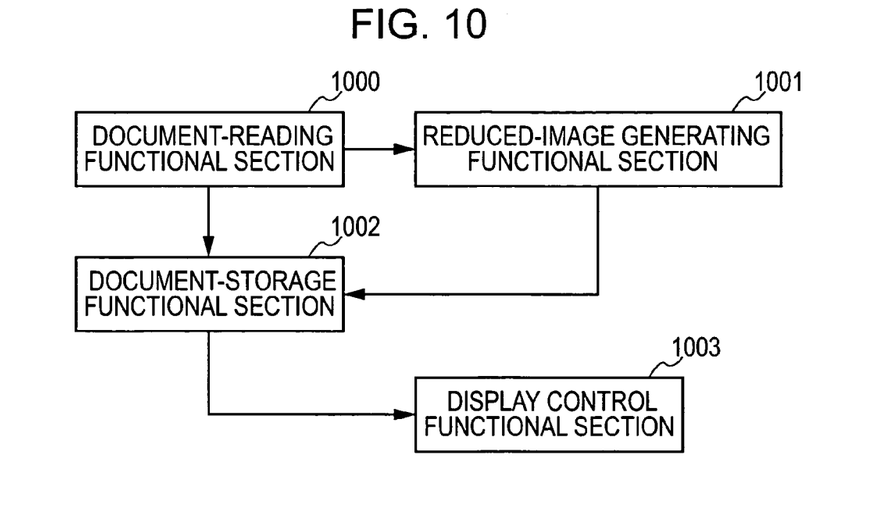
FIG. 10 is a block diagram depicting an example functional structure of a known electronic filing apparatus.
Figure 11:
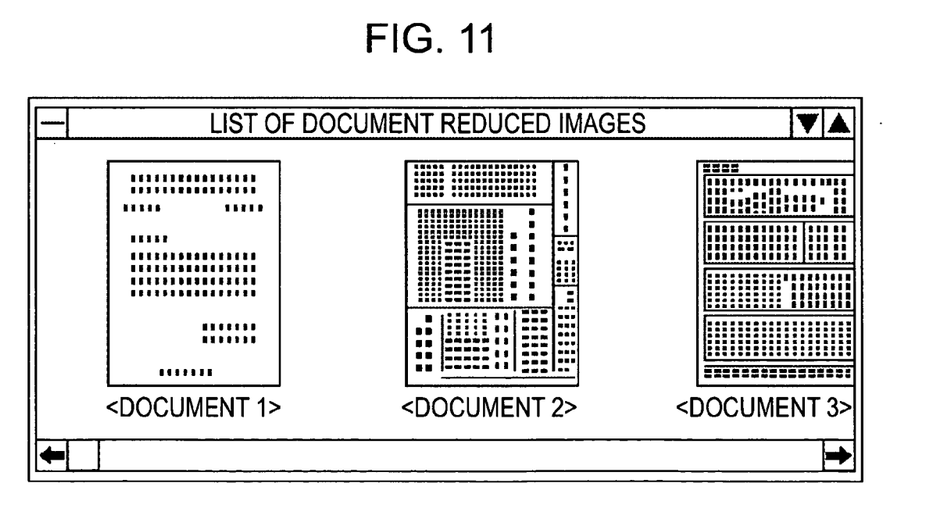
FIG. 11 shows an example of a document list displayed in the form of reduced images with a known method.

FIG. 10 is a block diagram depicting an example functional structure of a typical electronic filing apparatus for displaying reduced images in a document list and a search result list. Referring to FIG. 10, the electronic filing apparatus includes, for example, a document-reading section 1000, a reduced-image generating section 1001, a document-storage section 1002, and a display control section 1003. The document-reading section 1000 reads file data in the file system and document data received from a device not shown in the figure or via a network. The reduced-image generating section 1001 generates drawing data that is output when document data read by the document-reading section 1000 is to be displayed on the screen and generates image data reduced to an appropriate size from the drawing data through, for example, dot decimation. The document registration section 1002 links document data read by the document-reading section 1000 to reduced image data of the document generated by the reduced-image generating section 1001 and stores the linked data. The display control section 1003 controls the display of the document data and reduced images stored in the document-storage section 1002, and displays a document list based on the reduced images as shown in, for example, FIG. 11.

In many cases, the reduced image generated at this time is mainly related to the page output in respect of the top of the page.

On the other hand, U.S. 2002-0007367 A1 (Foreign Priority: Japanese Patent Laid-Open No. 2002-32364) describes technology for filtering elements of a document and arranging the filtered elements from the top of a page in order of importance to print (or display) the page. U.S. 2002-0007367 A1 is intended to allow users to efficiently recognize the content of a document composed of a plurality of elements when the document is to be printed or displayed.

In the above-described known technology, however, even though the outline of a document, such as the layout of the entire document, can be identified from a reduced image (thumbnail) of the document, it is difficult to recognize characters contained in the document from the reduced image. For this reason, it is very difficult to identify documents with similar layouts or documents with characterless layouts (that is to say, layouts lacking distinctive character), such as those without large characters or graphics, based on the above-described reduced image.

Figure 12:
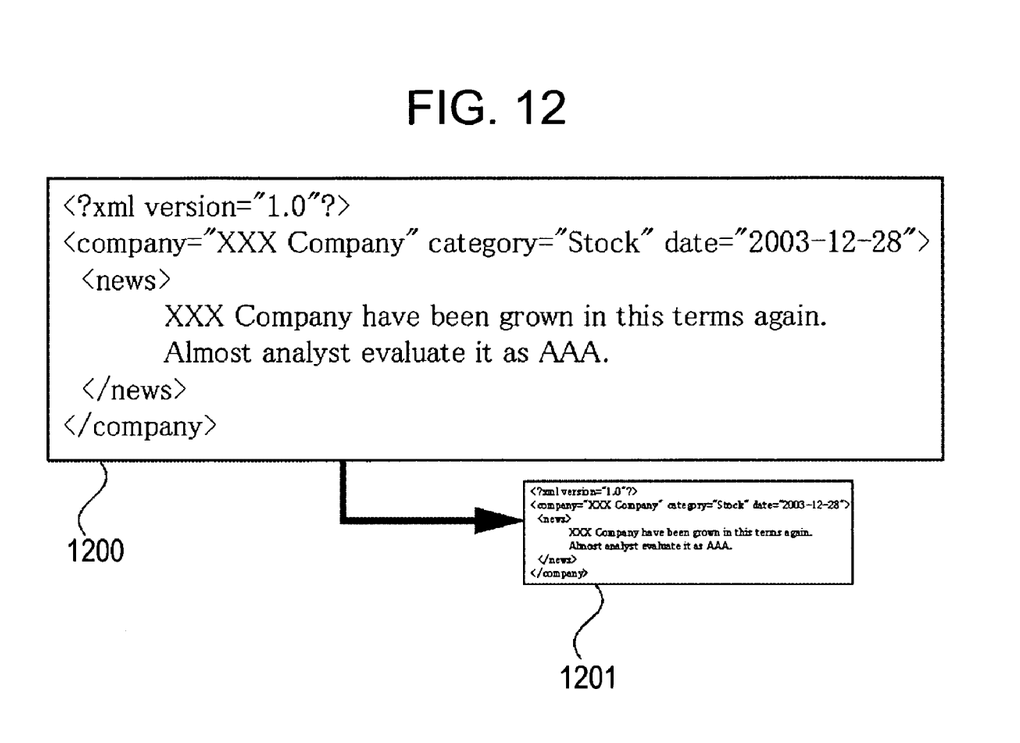
FIG. 12 shows XML data and a known reduced image generated from the XML data.

This difficulty becomes more noticeable especially when a reduced image has been generated from document data of text containing characters of basically uniform size, such as an XML document. The XML document data shown in FIG. 12 is a typical example. Reference numeral 1200 denotes the original document data to be input and stored in an electronic filing system, and reference numeral 1201 denotes a reduced image generated from the document data 1200. It is very difficult for a user of the known electronic filing system to learn the content of the document 1200 from this reduced image 1201.

According to the above-described U.S. 2002-0007367 A1, the structure of a document is analyzed to arrange elements in order of importance. In this case, elements to be displayed are selected based on their importance. However, since U.S. 2002-0007367 A1 does not take into account the generation of reduced images (thumbnails), the same problem arises when a document (e.g., a document which does not include large characters or graphics) is represented in a reduced image. Furthermore, since elements are arranged in order of importance, the original layout of the document is completely ignored. Therefore, even if there are some documents described in the same format, the documents cannot be compared based on the layout. This is problematic in that it is difficult to visually determine whether one document is similar to another.

SUMMARY OF THE INVENTION

According to one aspect of the present invention, an electronic filing system for registering a document includes: a style-sheet setting unit configured to set style sheet data in a storage unit; an input unit configured to input a document to be registered; a style-sheet acquisition unit configured to acquire style sheet data from the style sheet data set in the storage unit in which the input document is registered; and a conversion unit configured to convert the input document using the style sheet data acquired by the style-sheet acquisition unit. The system further includes a reduced-image generation unit configured to generate a reduced image from the document converted by the conversion unit; and a registration unit configured to link the reduced image generated by the reduced-image generation unit to the input document.

According to another aspect of the present invention, an electronic filing method for controlling a system for registering a document includes the steps of: setting style sheet data in a storage unit; inputting a document to be registered; acquiring style sheet data from the style sheet data set in the storage unit in which the input document is registered; and converting the input document using the style sheet acquired in the style-sheet acquiring step. The method further includes the steps of: generating a reduced image from the document converted in the converting step; and linking the reduced image generated in the reduced-image generating step to the input document.

According to still another aspect of the present invention, a computer program includes program code for controlling a computer to register and manage a document, where the program code executes the above-described electronic filing method.

According to yet another aspect of the present invention, a computer-readable recording medium stores the above-described computer program.

According to the present invention, even though a reduced image has been generated from document data basically containing text only, such as an XML document, important character strings and portions in the document can be given emphasis so that the important character strings and portions are recognizable. For this reason, even though documents have similar or characterless layouts, such as those without large characters or graphics, generated reduced images of the documents can be listed to allow a user to easily identify the content of the documents.

Furthermore, since the same portions of documents in the same document formats are given emphasis, documents with the same layouts can be identified as documents having the same format by visually comparing their respective reduced images.

Portions of a document given emphasis are not specified through automatic conversion of words or determined through parsing or semantic analysis of the document. Instead, a user himself or herself is allowed to specify which portions are to be given emphasis and how to give emphasis to such portions based on, for example, the structure and structure definition of a semi-structured document. This facilitates correct specification of portions to which emphasis is given, substantially preventing the portions to which emphasis is given from being incorrectly identified.

In addition, since different emphasis-providing methods, formats, and styles can be specified for each storage unit (e.g., folder), important portions can be defined in close association with document classification.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

First Embodiment

A first embodiment according to the present invention will now be described with reference to drawings.

Figure 1:
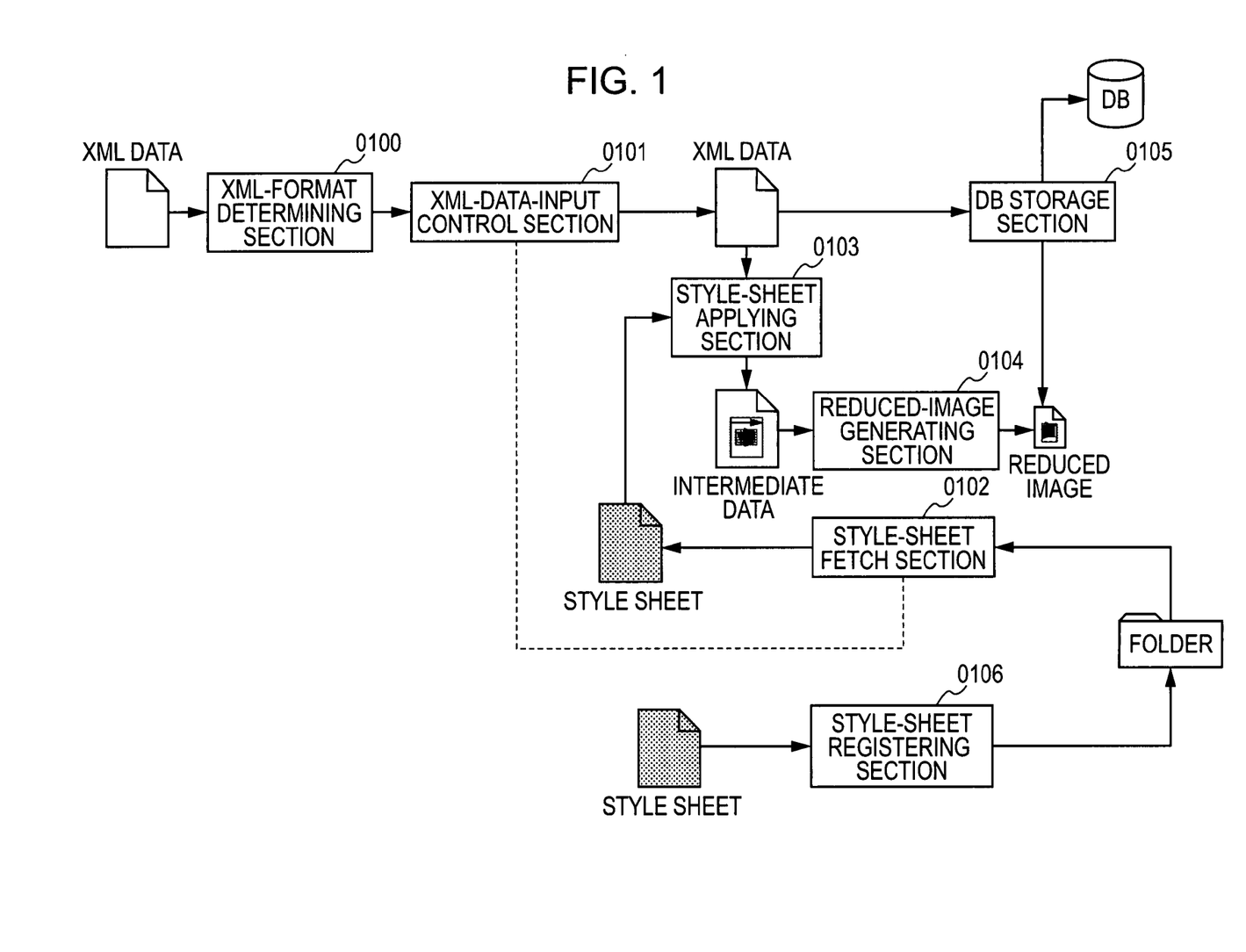
FIG. 1 is a block diagram according to a first embodiment of the present invention.

FIG. 1 shows one example structure according to the first embodiment.

An XML-format determining section 0100 determines whether input document data is an extensible Markup Language (XML) data. When XML data is to be input to a document filing system (document management system), a document input control section 0101 specifies the XML data to be input, and specifies a storage folder to which the XML document data is to be stored. A style-sheet fetch section 0102 fetches a style sheet registered in a storage unit (e.g., folder, cabinet, or directory as a document registration location). A style-sheet applying section 0103 applies a style sheet acquired from the storage unit to the input XML data and carries out data conversion to generate intermediate data. A reduced-image generating section 0104 generates a reduced image (thumbnail) from the generated intermediate data. A DB (database) storage section 0105 links the generated reduced image to the input document data and stores the linked reduced image and the document data in a database of the document filing system. A style-sheet registering section 0106 registers a style sheet in the storage unit (storage section) such as a folder. The style-sheet registering section 0106 can register a unique style sheet in each storage unit (e.g., folder).

Figure 2A:
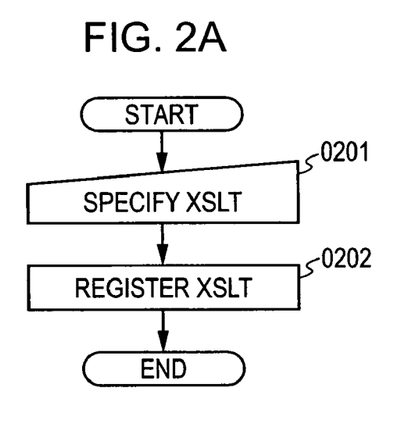
FIGS. 2A and 2B are flowcharts according to the first embodiment of the present invention.
Figure 2B:
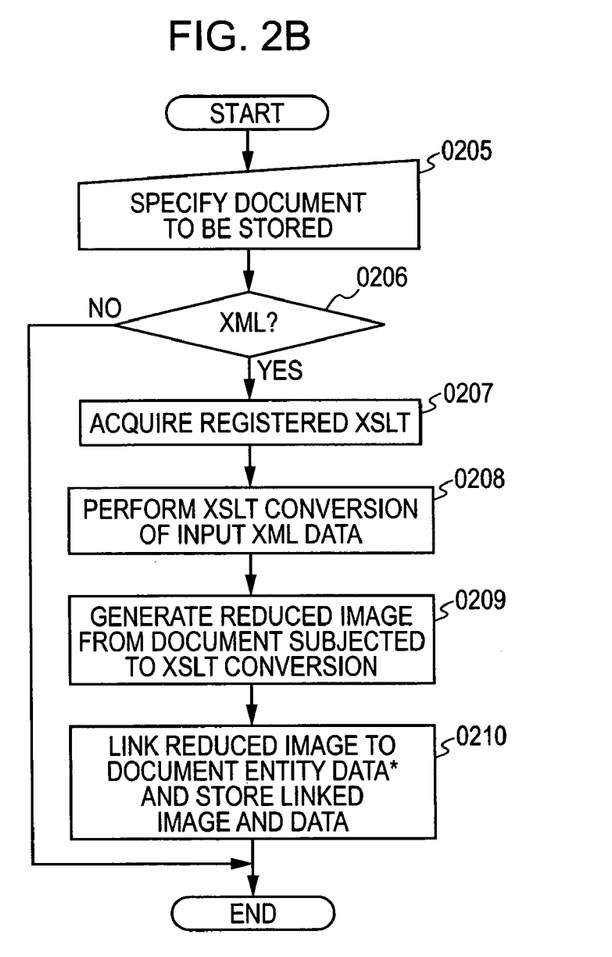

FIGS. 2A and 2B are flowcharts illustrating a procedure and an apparatus for generating a reduced image according to the first embodiment with the above-described structure. The flowchart in FIG. 2A illustrates a procedure for registering a style sheet in a document storage unit (e.g., folder), and the flowchart in FIG. 2B illustrates a procedure for generating a reduced image when an XML data document is to be stored in the database of the document filing system.

Figure 3:
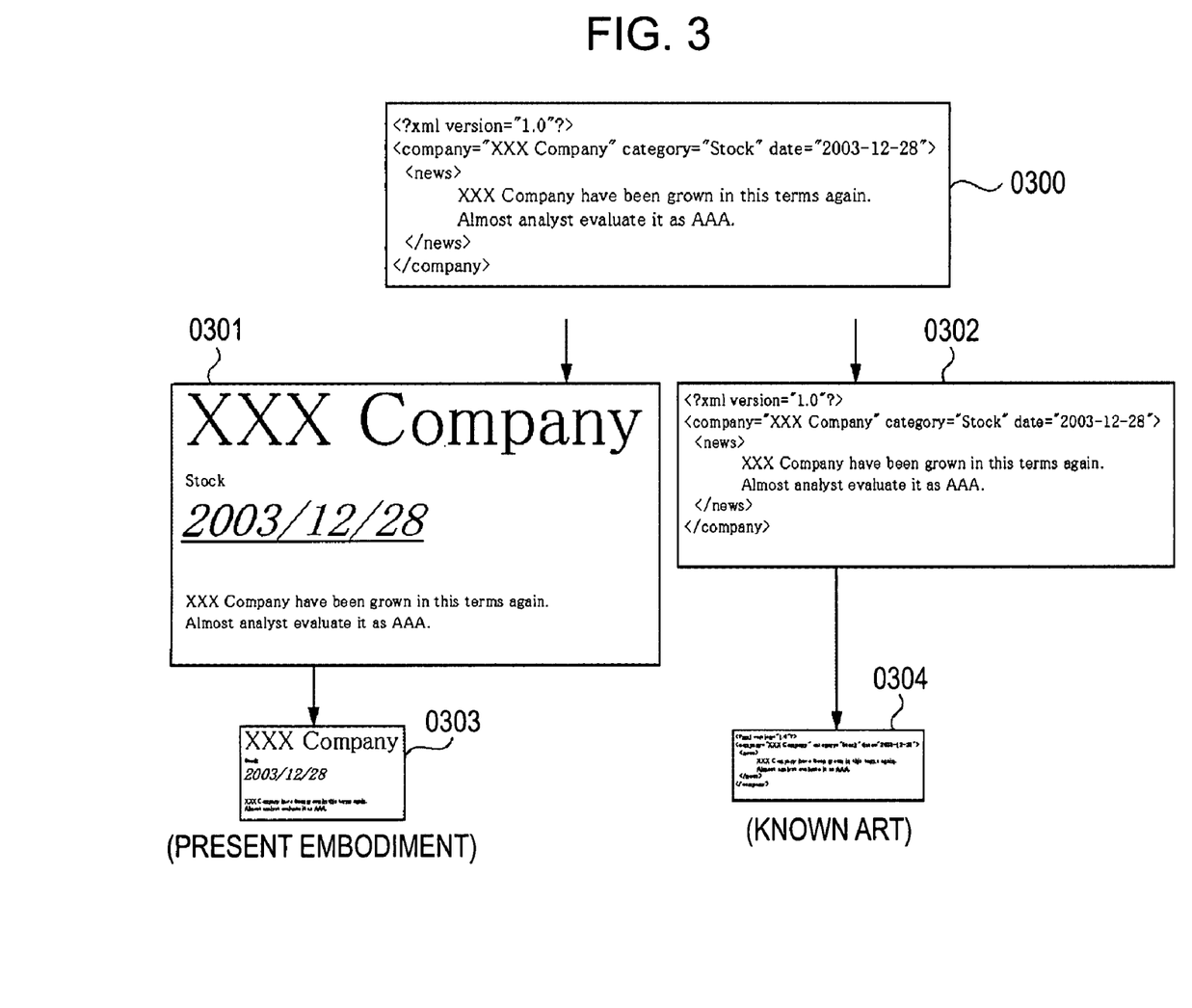
FIG. 3 shows one example of data transformation according to the first embodiment of the present invention.

FIG. 3 shows one example of data transformation according to the first embodiment and data transformation according to the known method. FIG. 3 will also be referred to to describe the first embodiment.

The flowchart in FIG. 2B will be described. First, when document data 0300 is to be input to the document filing system for storage in step 0205, the XML-format determining section 0100 checks whether the input document data is XML data in step 0206. If it is determined that the specified data is XML, the style-sheet fetch section 0102 acquires, in step 0207, a style sheet (described by way of XML Stylesheet Language Transformations (XSLT) here) registered in the folder to which the document data is stored. It is assumed that the folder to which the document data is stored has been specified by the user or was automatically determined by the filing system.

Next, in step 0208, the style-sheet applying section 0103 converts the input XML document data 0300 with the XSLT data acquired in step 0207 and generates intermediate data 0301. In step 0209, the reduced-image generating section 0104 generates a reduced image 0303 from the generated intermediate data 0301. Finally, in step 0210, the DB storage section 0105 links the reduced image 0303 to the input XML document data 0300 and stores the linked reduced image 0303 and XML document data 0300 in the database (DB). In this first embodiment, if it is determined in step 0206 that the specified data is not XML data, a reduced image is generated in the form of a miniaturized version of the input document, as with the known technology, and is then stored in the database.

On the other hand, if the XML data 0300 shown in FIG. 3 is reduced with the known technology, a reduced image 0304 is generated based on intermediate data 0302 that is an image of the text data. As shown in FIG. 3, the document can easily be identified from the reduced image 0303 generated according to the present invention compared with the reduced image 0304 generated according to the known technology.

The XSLT data acquired in the above-described step 0207 is registered by carrying out each step in the XML flowchart in FIG. 2A. First, in step 0201, the user specifies XSLT data to be registered in the storage unit (e.g., folder). Next, in step 0202, the style-sheet registering section 0106 can register the specified XSLT data in each specified storage unit (e.g., each folder) or in a plurality of storage units (e.g., a parent folder composed of a plurality of folders).

Figure 4:
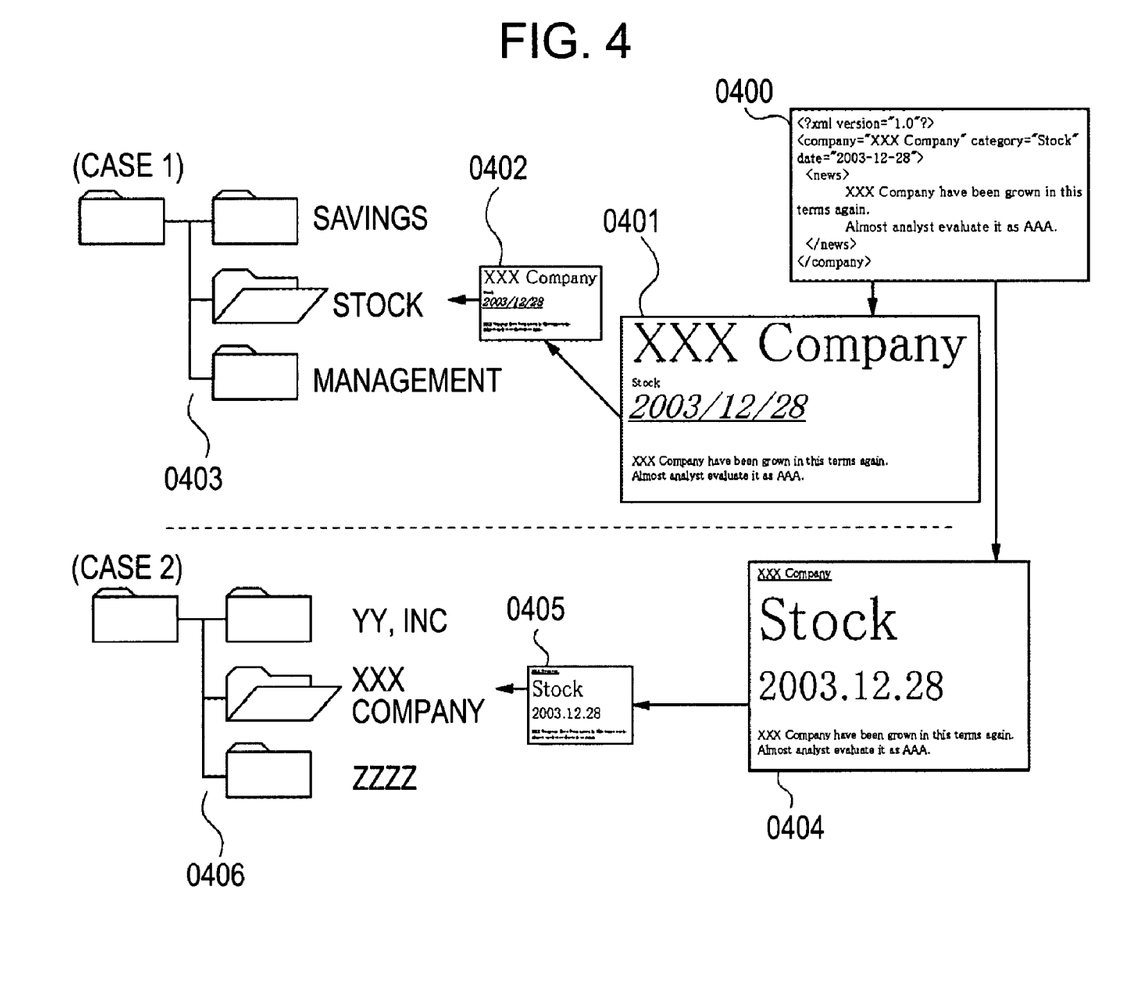
FIG. 4 is a specific application example according to the first embodiment of the present invention.

With this feature that a style sheet can be registered in each storage unit or in a plurality of storage units, the reduced image of the input document data can be generated such that the most useful portions of documents stored in a folder constructed by the user are given emphasis. FIG. 4 is a diagram depicting specific examples of this feature: Case 1 where a folder structure 0403 is classified by category and Case 2 where a folder structure 0406 is classified by company. Despite the same input XML data 0400, the user may want to emphasize different portions in reduced images of the XML data 0400 according to different folder structures such as those in Case 1 and Case 2. In Case 1, companies may desirably be identified rather than categories in the reduced images of documents registered in each folder since the folders are classified by category (i.e., the category can be identified by the registered folders). For this purpose, XSLT data that does not emphasize "Stock", which is a value corresponding to category, but emphasize "XXX Company", which is a value corresponding to company, is registered in the folders, so that the XML data 0400 is converted into intermediate data 1 (0401) using the XSLT data to generate a reduced image 0402. On the other hand, in Case 2, categories may desirably be identified rather than companies in the reduced images of documents registered in each folder since the folders are classified by company (i.e., the company can be identified by the registered folders). For this purpose, XSLT data that does not emphasize a value corresponding to company, but emphasizes "Stock", which is a value corresponding to category, is registered in the folders in Case 2, so that the XML data 0400 is converted into intermediate data 0404 using the XSLT data to generate a reduced image 0405.

According to this embodiment, even though a reduced image has been generated from document data basically containing text only, such as an XML document, important character strings and portions in the document can be given emphasis so that the important character strings and portions are recognizable. For this reason, even though documents have similar or characterless layouts, such as those without large characters or graphics, generated reduced images of the documents can be listed to allow a user to easily identify the content of the documents.

In addition, since different emphasis methods, formats, and styles can be specified for each storage unit, important portions can be defined in close association with document classification.

Although documents in the XML format are used as an example in this embodiment, a structured document in another format may also be acceptable. If this is the case, the format of the document is converted using a style sheet for converting the format of the document to generate a reduced image of the document.

Second Embodiment

Figure 5:
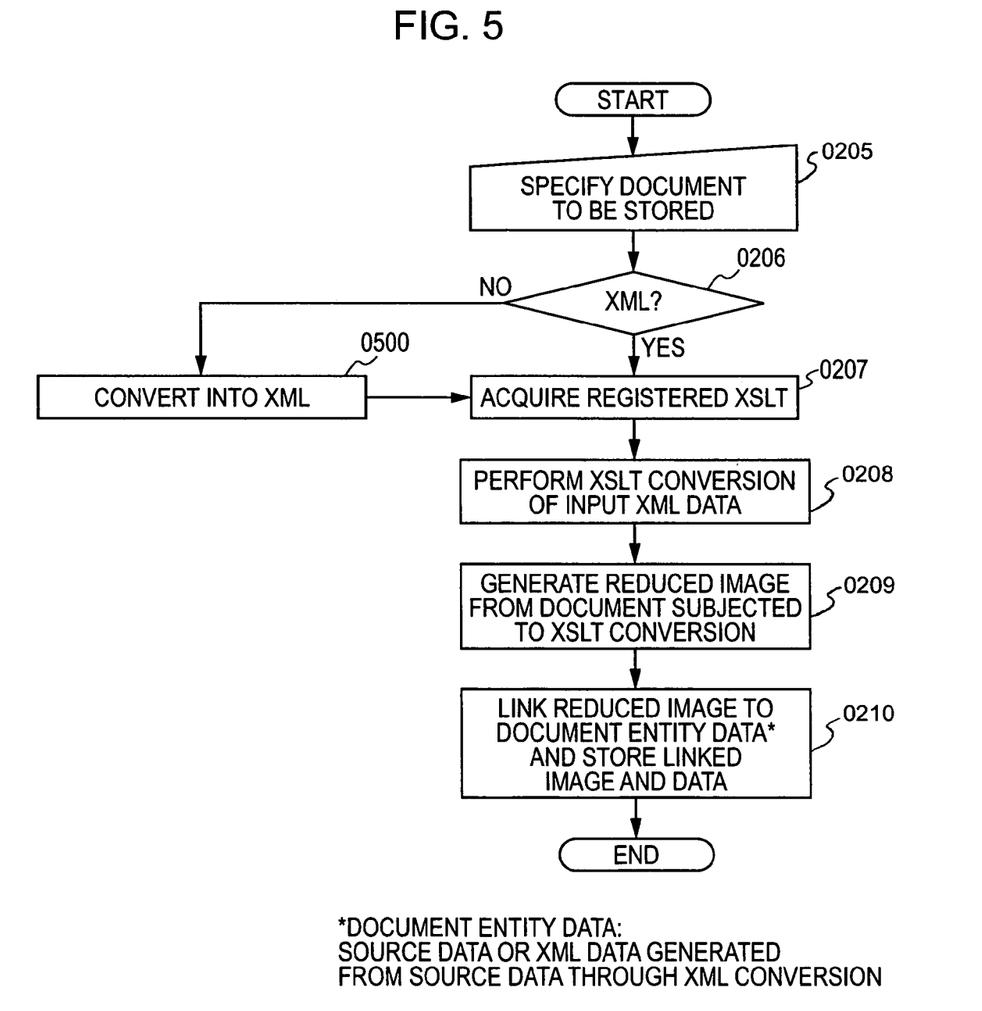
FIG. 5 is a flowchart according to a second embodiment of the present invention.

In the first embodiment, if it is determined in step 0206 that the input document is a structured document (e.g., XML document), the processing in step 0207 and the subsequent processing are carried out. The present invention can also be realized as shown in the flowchart of FIG. 5. That is, if it is determined in step 0206 that the specified data is not XML data, the flow proceeds to step 0500, where the input data is converted into XML and then the processing in step 0207 and the subsequent processing are carried out as described in the first embodiment. For conversion into XML, appropriate tags are placed by carrying out, for example, layout analysis, parsing, and semantic analysis to structurize the input document (convert the input document into XML data).

According to this embodiment, even if input data is not XML data, important character strings and portions in the document can be given emphasis so that they are recognizable. For this reason, even though documents have similar or characterless layouts, such as those without large characters or graphics, reduced images generated from the documents can be listed to allow a user to easily identify the content of the documents.

In addition, since different emphasis methods, formats, and styles can be specified for each storage unit, important portions can be defined in close association with document classification.

Third Embodiment

Figure 6:
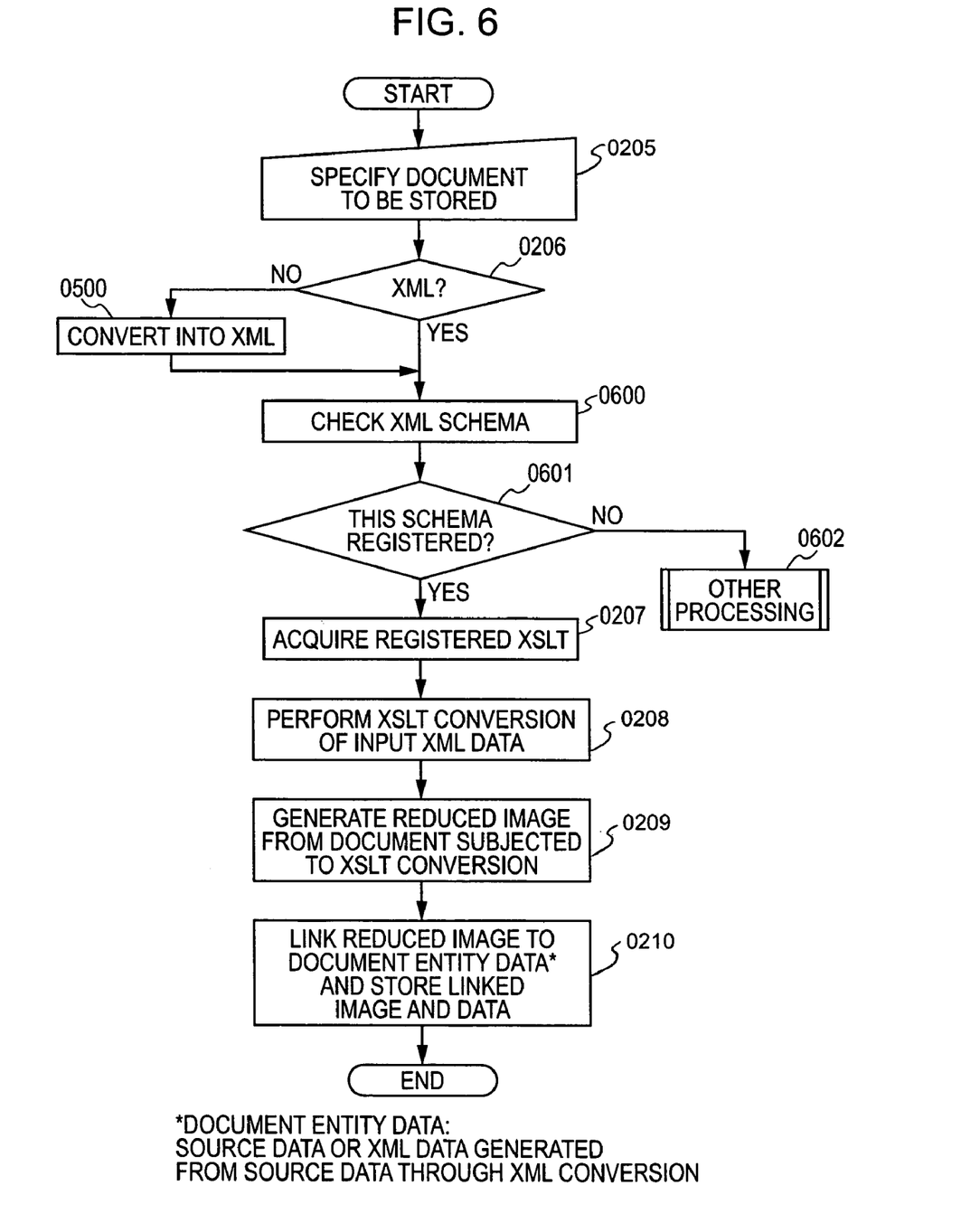
FIG. 6 is a flowchart according to a third embodiment of the present invention.

In the first and second embodiments, format conversion is carried out with XSLT data, wherein the XSLT data registered in a single storage folder is just a single item. In this third embodiment, when XSLT data is to be registered, corresponding schema information can also be registered to allow a plurality of items of XSLT data to be registered in one folder. As shown in the flowchart of FIG. 6, after it is determined in 0206 that the input data is XML data (or after the input data is converted into XML in 0500), the schema of the input XML data is checked. Then, it is determined whether XSLT data corresponding to the checked schema is registered in the folder (it is determined whether it is appropriate to process the input XML document based on the schema of the XML document). If it is determined that XSLT data corresponding to the checked schema is registered, conversion is carried out using the XSLT data corresponding to the schema in step 0207. On the other hand, if it is determined that XSLT data corresponding to the checked schema is not registered, the flow proceeds to step 0602, where other processing, such as generating a reduced image by the known method (or rejecting document registration), can be carried out.

According to this third embodiment, a plurality of items of XSLT data are registered in a folder and a corresponding style sheet can automatically be selected according to the schema of the input XML. Because of this, even when data corresponding to a plurality of schemas is input to one folder, a reduced image having appropriate portions given emphasis for display can be generated.

Fourth Embodiment

In the third embodiment, a style sheet corresponding to the schema of a document input by the user needs to be prepared and registered. In a fourth embodiment, if the input XML data is not XML data appropriate for a registered schema, XSLT is automatically generated at that time via a UI that allows the user to specify which portions to emphasize.

Figure 7:
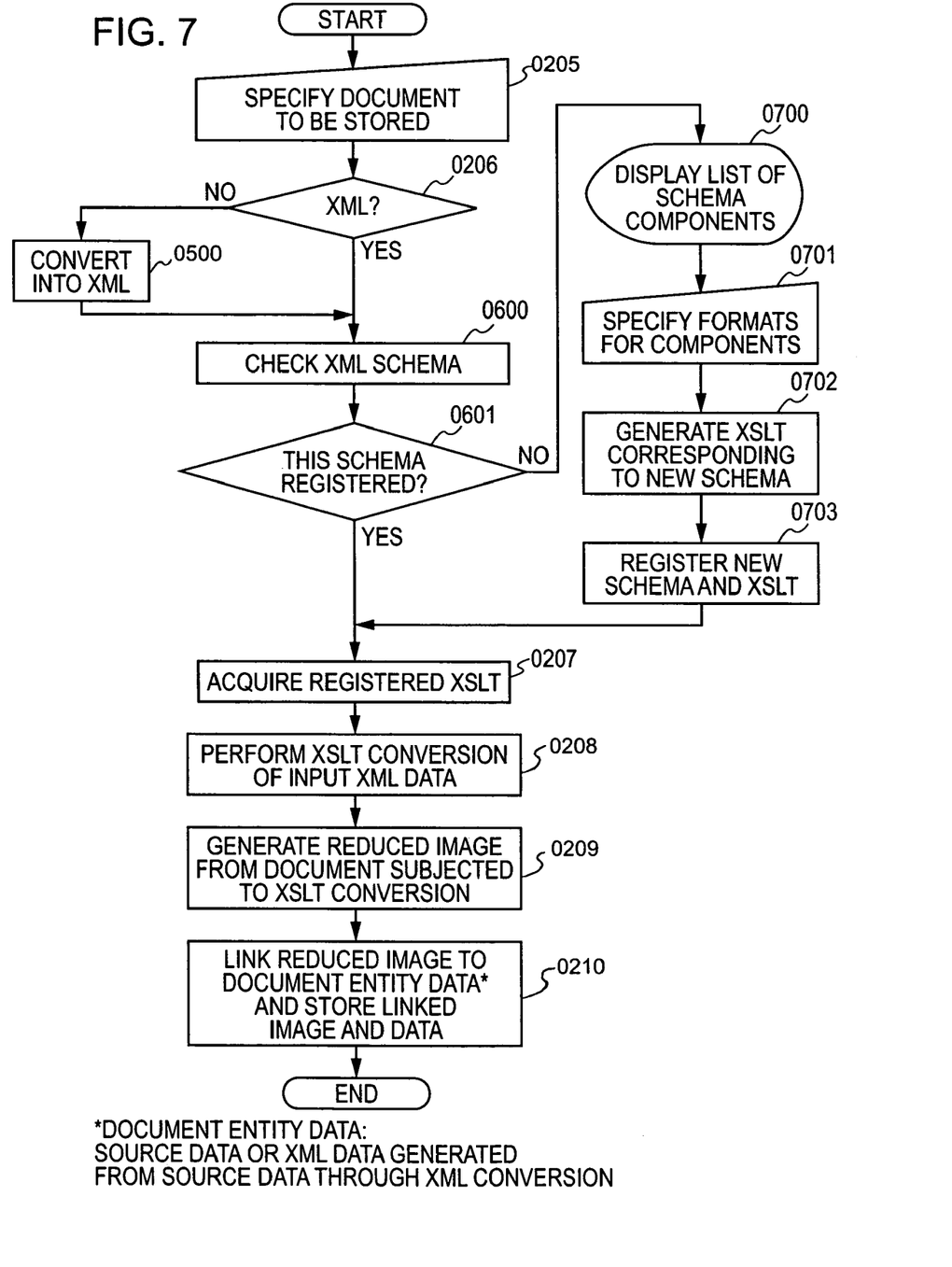
FIG. 7 is a flowchart according to a fourth embodiment of the present invention.
Figure 8:
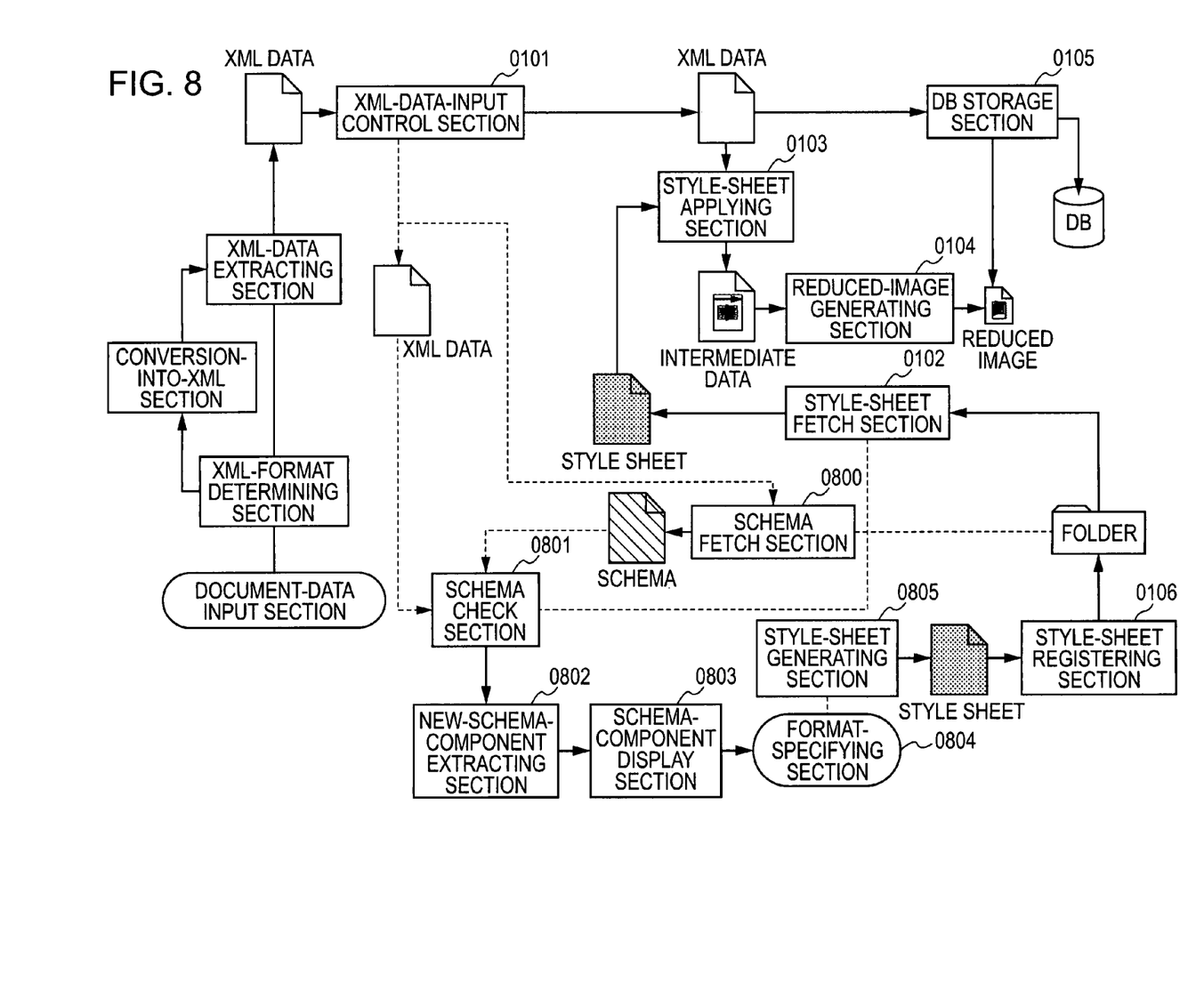
FIG. 8 is a block diagram according to the fourth embodiment of the present invention.

FIG. 7 is a flowchart illustrating a procedure and an apparatus for generating a reduced image according to this embodiment. FIG. 8 shows one example of a structure according to the fourth embodiment.

Figure 9:
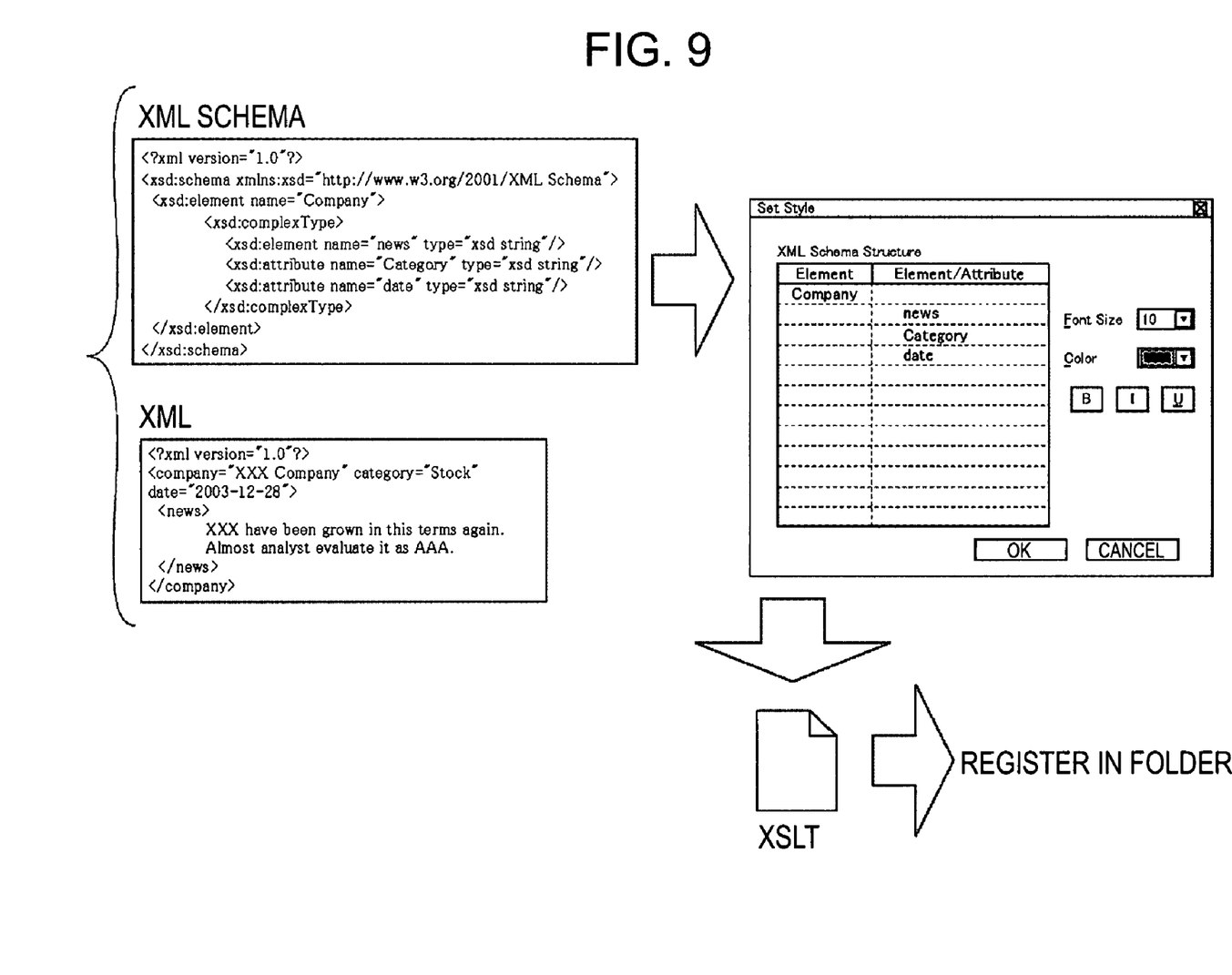
FIG. 9 shows one example of a GUI for producing an XSLT used in the present invention.

After the document input control section 0101 has received XML data, the schema fetch section 0800 acquires the schema registered in the folder specified as a storage unit in which the input document is registered to check the schema of the XML in step 0600. If it is determined in step 0601 that the input XML data is appropriate for the registered schema, the processing in step 0207 and the subsequent processing are carried out using the corresponding XSLT data in the same manner as with the above-described third embodiment. On the other hand, if it is determined in step 0601 that the input XML data is not appropriate for the registered schema, the flow proceeds to step 0700. In step 0700, from the schema of the input XML data, elements constituting the data (elements, attributes for XML) are extracted by a new-schema-component extracting section 0802 to perform list display by a schema-component display section 0803. FIG. 9 is an example where components are extracted from XML data assumed to be input and its schema and list display is performed in a dialog. The user can specify what format conversion (e.g., coloring characters, changing font types, and changing sizes) should be applied to which component via this GUI. In response, a format-specifying section 0804 carries out this processing in step 0701. In response to the input in step 0701, a style-sheet generating section 0805 generates a style sheet in step 0702. In step 0703, the generated style sheet is registered in the storage folder via the style-sheet registering section 0106.

According to this embodiment, even when XML data not corresponding to XSLT data registered in the folder is input, corresponding XSLT data can be generated as required. Because of this, data can be input and a reduced image that is easily identified can be generated regardless of whether corresponding XSLT is registered when the user inputs data.

Fifth Embodiment

The third and fourth embodiments assume that only one item of XSLT data corresponds to one schema. Alternatively, a plurality of items of XSLT data can be registered in one schema. In this case, when XML data is input, the user needs to be able to select from among XSLTs registered in schemas determined as appropriate through schema check.

According to this embodiment, a requirement such that only particular ones of documents to be stored in the same folder should have different emphasis can be flexibly addressed.

Sixth Embodiment

In the above-described embodiments, applied XSLT data are switched according to storage folder. In a sixth embodiment, applied XSLT data are also switched according to data type. More specifically, applied XSLT data are switched according to the data type of the input-source document: e.g., style sheet A is applied to data extracted by converting from BMP data into XML and style sheet B is applied to data extracted by converting from TIFF data into XML.

According to this embodiment, a corresponding style sheet can be automatically selected according to the data type of the input document. Thus, a reduced image where appropriate portions are given emphasis for display according to the data type can be generated.

Seventh Embodiment

According to a seventh embodiment, XSLT data to be fetched are switched according to the user for inputting data or generating a reduced image or account information, besides the conditions described in the forgoing embodiments.

With this structure, reduced image data to be generated can be switched according to the user, and thus, the user who has input the data in question can be determined from the reduced image.

Eighth Embodiment

In the above-described embodiments, applied XSLT data is the same in the case of the same schema, the same folder, the same user, and the same account. According to an eighth embodiment, an XPath expression can be registered in a folder or XSLT data to switch applied XSLT data according to whether the XPath expression is satisfied. For example, when news documents A and B are input, the documents A and B can be discriminated between such that the title of the articles of the document A is not given emphasis if the articles of the document A are old, whereas the title of the articles of the document B is given emphasis if the articles of the document B are new.

According to this embodiment, portions to be given emphasis can be changed according to the content of the input data.

Ninth Embodiment

In the above-described embodiments, it is assumed that the user specifies a storage folder. Alternatively, when a document is input to a self-determining folder, a storage folder can automatically be determined according to the schema of the input document.

For example, a set of schema data, corresponding XSLT data, and a storage folder name are registered in a self-determining folder. When certain XML data is input to the folder, the schema of the XML data is checked. The XML data is converted using XSLT data which has been determined as appropriate to generate a reduced image. When the data is to be registered, the data is automatically distributed to a storage folder registered in association with the schema.

According to this embodiment, it is not necessary for the user to specify a storage folder before inputting a document, and documents with the same schema are collected in the same folder. This allows portions to be given emphasis in a style sheet to be selected more specifically, improving accessibility to target documents in the entire system.

Other Embodiments

The present invention according to the first to ninth embodiments can be realized in the form of, for example, a system, an apparatus, a method, a program, or a storage medium. More specifically, the present invention can be applied to a system including a plurality of devices or an apparatus including one device.

In addition, the present invention can also be achieved by directly or remotely supplying a system or an apparatus with program code of software which realizes the functions of the above-described embodiments (programs corresponding to the flowcharts in the embodiments) and then causing the computer of the system or apparatus to read and execute the supplied program code.

Therefore, the program code itself that is installed in a computer to achieve the functional processing of the present invention using the computer constitutes an aspect of the present invention. In short, a computer program itself for realizing the functional processing of the present invention is included within the scope of the present invention.

In this case, any form of program, including a program executed as object code or by an interpreter and script data supplied to the OS (operating system), is acceptable, as long as it functions as a program.

A storage medium for supplying the program code includes a Floppy Disk, a hard disk, an optical disk, a magneto-optical disk, an MO, a CD-ROM, a CD-R, a CD-RW, a magnetic tape, a non-volatile memory card, a ROM, and a DVD (DVD-ROM and DVD-R).

Such a program can be supplied by accessing a home page on the Internet with a browser of a computer and then downloading from the home page into a recording medium, such as a hard disk, the computer program itself according to the present invention or a compressed file of the program including an automatic installation function. Furthermore, the present invention can also be realized by dividing the program code constituting the program according to the present invention into a plurality of files and downloading each of the files from different home pages. In other words, a server for allowing a plurality of users to download program files for realizing the functional processing of the present invention into a computer is included within the scope of the present invention.

In addition, the present invention can also be realized by supplying a user with a recording medium, such as a CD-ROM, storing an encrypted version of the program according to the present invention, allowing only a user satisfying predetermined conditions to download key information for decrypting the encrypted program from a home page via the Internet, and executing the encrypted program with the key information to install the program into the computer.

As described above, the functions of the above-described embodiments are achieved with the execution of the program code read by the computer. In addition, the functions of the above-described embodiments can also be achieved by, for example, the OS running on the computer that performs all or part of the processing according to the commands of the program code.

Furthermore, the functions of the above-described embodiments can also be achieved such that the program code read from a storage medium is written to a memory provided in an expansion card disposed in the computer or an expansion unit connected to the computer, and then, for example, the CPU provided on the expansion card or the expansion unit performs all or part of the processing based on commands in the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-307160 filed Oct. 21, 2004, which is hereby incorporated by reference herein in its entirety.

What is claimed is:

1. An electronic filing system for registering a document, comprising:
    at least one processor coupled via a bus to a memory, the processor being programmed to control one or more of:
        a style-sheet setting unit configured to set any one of a plurality of style sheet data to any one of a plurality of folders, wherein a portion of a document is emphasized by converting the document using the set style sheet data, the portion of the document to be emphasized being different depending on each style sheet data;
        an input unit configured to input a document to be registered into one of the plurality of folders, the one of the plurality of folders being specified by a user;
        a style-sheet acquisition unit configured to acquire the style sheet data set to the specified folder into which the document is input by the input unit;
        a conversion unit configured to convert the input document using the style sheet data acquired by the style-sheet acquisition unit to obtain the input document of which a portion corresponding to the acquired style sheet data has been emphasized;
        a reduced-image generation unit configured to generate a reduced image from the obtained document of which the portion corresponding to the acquired style sheet data has been emphasized, wherein the reduced image itself provides a preview of a portion of the document; and
        a registration unit configured to link the reduced image generated by the reduced-image generation unit to the input document being stored into the specified folder.

2. The electronic filing system according to claim 1, wherein the input document to be converted by the conversion unit is an XML document, and the style sheet data is XSLT data.

3. The electronic filing system according to claim 1, wherein the input document to be converted by the conversion unit is a structured document.

4. The electronic filing system according to claim 1, wherein the processor is programmed to control one or more of:
    a determining unit configured to determine whether the document input by the input unit is a structured document; and
    a structurizing unit configured to structurize the input document into a structured document if the determining unit determines that the input document is not a structured document,
    wherein the conversion unit converts the structured document structurized by the structurizing unit using the style sheet data acquired by the style-sheet acquisition unit if the determining unit determines that the input document is not a structured document, and converts the input document using the style sheet data acquired by the style-sheet acquisition unit if the determining unit determines that the input document is a structured document.

5. An electronic filing method for controlling a system for registering a document, the method comprising the steps of:
    setting any one of a plurality of style sheet data to any one of a plurality of folders, wherein a portion of a document is emphasized by converting the document using the set style sheet data, the portion of the document to be emphasized being different depending on each style sheet data;

inputting a document to be registered into one of the plurality of folders, the one of the plurality of folders being specified by a user;

acquiring style sheet data set to the specified folder into which the document is input in the inputting step;

converting the input document using the style sheet data acquired in the style-sheet acquiring step to obtain the input document of which a portion corresponding to the acquired style sheet data has been emphasized;

generating a reduced image from the obtained document of which the portion corresponding to the acquired style sheet data has been emphasized, wherein the reduced image itself provides a preview of a portion of the document; and linking the reduced image generated in the reduced-image generating step to the input document being stored into the specified folder.

6. A non-transitory computer readable storage medium storing a computer program for controlling a computer to execute an electronic filing method, the method comprising the steps of:

setting any one of a plurality of style sheet data to any one of a plurality of folders, wherein a portion of a document is emphasized by converting the document using the set style sheet data, the portion of the document to be emphasized being different depending on each style sheet data;

inputting a document to be registered into one of the plurality of folders, the one of the plurality of folders being specified by a user;

acquiring style sheet data being set to the specified folder into which the document is input in the inputting step;

converting the input document using the style sheet data acquired in the style-sheet acquiring step to obtain the input document of which a portion corresponding to the acquired style sheet data has been emphasized;

generating a reduced image from the obtained document of which the portion corresponding to the acquired style sheet data has been emphasized, wherein the reduced image itself provides a preview of a portion of the document; and linking the reduced image generated in the reduced-image generating step to the input document being stored into the specified folder.

* * * * *